US012754826B2

(12) United States Patent
Huth et al.

(10) Patent No.: US 12,754,826 B2
(45) Date of Patent: Oct. 6, 2026

(54) METHOD FOR TREATING UNCERTAINTY ESTIMATES FOR NON-DETERMINISTIC FUZZ EXECUTIONS

(71) Applicant: Robert Bosch GmbH, Stuttgart (DE)

(72) Inventors: Christopher Huth, Heilbronn (DE); Maria Irina Nicolae, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 236 days.

(21) Appl. No.: 18/623,279

(22) Filed: Apr. 1, 2024

(65) Prior Publication Data

US 2024/0354235 A1 Oct. 24, 2024

(30) Foreign Application Priority Data

Apr. 20, 2023 (DE) ..................... 10 2023 203 625.8

(51) Int. Cl.
*G06F 11/3668* (2025.01)

(52) U.S. Cl.
CPC ...... *G06F 11/3684* (2013.01); *G06F 11/3676* (2013.01); *G06F 11/3688* (2013.01)

(58) Field of Classification Search
CPC ............. G06F 11/3676; G06F 11/3684; G06F 11/3688
See application file for complete search history.

(56) References Cited

U.S. PATENT DOCUMENTS 7,594,142 B1 * 9/2009 O'Leary ............... G06F 21/577 714/38.11
2024/0211834 A1 * 6/2024 Campobasso .. G06Q 10/063116

OTHER PUBLICATIONS

Cai, Zhen, Honglin Wang, and Xiaojun Qin. "A Heuristic Guided Optimized Strategy for Non-Deterministic Mutation." Proceedings of the 3rd International Conference on Computer Science and Application Engineering. 2019. (Year: 2019).*
Shen, Ning, et al. "A practical and secure stateless order preserving encryption for outsourced databases." 2021 IEEE 26th Pacific Rim International Symposium on Dependable Computing (PRDC). IEEE, 2021. (Year: 2021).*
Natella, Roberto. "Stateafl: Greybox fuzzing for stateful network servers." Empirical Software Engineering 27.7 (2022): 191. (Year: 2022).*

(Continued)

*Primary Examiner* — Jay A Morrison
(74) *Attorney, Agent, or Firm* — Norton Rose Fulbright US LLP

(57) ABSTRACT

A method for treating uncertainty estimates for non-deterministic fuzz executions in a fuzzing system including: initializing the fuzzing system by setting observations of the fuzzer blank or to one or more initial test cases that are executed on a target program; executing test cases; creating an output report for the test case which includes information about a code coverage of the target program; repeating the execution of the test case to determine whether the test case leads to jitter or non-deterministic behavior in the target program; deciding how often the test case is to be executed to obtain an optimized estimate of the code path distribution; deciding whether and how test cases are mutated to minimize overall uncertainty and to investigate more areas in the target program; and adding, to the corpus of the test cases, the new test cases which cause a new behavior of the target program.

10 Claims, 2 Drawing Sheets

(56) References Cited

OTHER PUBLICATIONS

Okech, et al.: "Investigating Execution Path Non-Determinism in the Linux Kernel," Proceeding 14th Real Time Linux Workshop, Lugano, Osadl, (2013), pp. 1-8; https://opentech.at/assets/papers/nondeterminism.pdf, Downloaded Mar. 28, 2024.
Wen, et al.: "MEMLOCK: Memory Usage Guided Fuzzing," 2020 IEEE/ACM 42nd International Conference on Software Engineering, (ICSE,) 2020, pp. 765-777; https://wcventure.github.io/pdf/ICSE2020_MemLock.pdf, Downloaded Mar. 28, 2024.
"American Fuzzy LOP," pp. 1-12; https://github.com/aflnet/aflnwe, Downloaded Mar. 28, 2024.
"STATEAFL: A Coverage-Driven (Greybox) Fuzzer for Stateful Network Servers," pp. 1-7. https://github.com/stateafl/stateafl, Downloaded Mar. 28, 2024.
"AFLNET: A Greybox Fuzzer for Network Protocols," pp. 1-9; https://github.com/aflnet/aflnet Downloaded Mar. 28, 2024.

* cited by examiner

METHOD FOR TREATING UNCERTAINTY ESTIMATES FOR NON-DETERMINISTIC FUZZ EXECUTIONS

CROSS REFERENCE

The present application claims the benefit under 35 U.S.C. § 119 of German Patent Application No. DE 10 2023 203 625.8 filed on Apr. 20, 2023, which is expressly incorporated herein by reference in its entirety.

BACKGROUND INFORMATION

For software testing, the dynamic software test method fuzzing is used, among other things. Fuzzing, also known as fuzz testing, is particularly well-suited for testing robustness or generating negative test cases, and is an automated technique for software tests in which the program to be tested is repeatedly fed with random data at one or more input interfaces. The program is then monitored for exceptions such as crashes, failed integrated code assertions or potential memory leaks. Fuzzers are normally used for testing programs that process structured inputs. This structure is specified, for example, in a file format or a file format or protocol and distinguishes between valid and invalid inputs. An effective fuzzer generates semi-valid inputs that are "valid enough" not to be rejected immediately by the parser but cause unexpected behaviors in the program and that are "invalid enough" to reveal borderline cases that have not been implemented correctly.

Current non-statistical fuzzers such as AFL, Honggfuzz or libFuzzer offer mutation-based, coverage-controlled fuzzing for testing software with little effort. Here, at each round a seed input is selected from the input corpus, mutated randomly and sent to the target program. If the newly generated input triggers a previously unseen behavior (such as new executed code paths), it is added to the input corpus. In this way, the input space of a program can be investigated with little to no knowledge of the input format.

There are feedback-controlled fuzzers for network protocols (state-dependent fuzzers), such as AFLnwe, a network-capable version of AFL, which sends inputs via TCP/IP sockets instead of files (https://github.com/aflnet/aflnwe), AFLnet, a fuzzer which is tailored to state-dependent network servers (https://github.com/aflnet/aflnet), and stateAFL, another fuzzer for state-dependent network servers (https://github.com/stateafl/stateafl). Instead of specifying a protocol (as in the case of the peach and boofuzz tools) that the fuzzer then follows, previous tools learn the protocol during fuzzing. The actual learning or protocol estimation is based on observation of the responses of the protocol partner and on internal information which can be obtained by the instrumentation of the protocol partner, i.e. of the fuzz target.

Jitters, for example in the form of random delays in messages over a network, interfere with the learning process of the state machine of state-dependent fuzzers. Current methods and tools require a more or less accurate (or deterministic) timing of protocol messages.

The work of Okech et al. ("Investigating execution path non-determinism in the Linux kernel," in Proc. 14th Real Time Linux Workshop, Lugano. OSADL, 2013) investigates the non-deterministic behavior of programs that use the Linux kernel. This work shows time and path variability during repeated execution of a test program. In the case of non-deterministic behavior, it is to be expected that, in the case of different independent executions, the program executes the same instructions in the same time span. Complex software systems that run on non-deterministic hardware have a certain degree of inherent randomness, which leads to system fluctuations in the associated code paths.

Reasons for non-deterministic behavior are non-deterministic hardware itself, such as page errors or memory-cache allocation requests; interruptions; interaction with other processes/threads, for example arbitration of system resources or writing to a shared memory; random delays for messages, for example over a network or machine-internally.

Jitter also occurs when programs access the memory. Wen et al. ("Memlock: Memory usage guided fuzzing," in Proceedings of the ACM/IEEE 42nd International Conference on Software Engineering, pages 765-777, 2020) optimize a fuzzer to detect errors in memory consumption. This method attempts to prevent and reduce jitter. Wen et al. attempt to prevent randomness in the form of jitter with two measures. Firstly, they test each program over a longer runtime. Secondly, they average the results over several test runs.

The related art cannot deal with non-deterministic delays in the observation of fuzzing feedback, such as, for example, in the case of jitter-prone network messages or interruptions.

SUMMARY

A first general aspect of the present invention relates to a method for treating uncertainty estimates for non-deterministic fuzz executions in a fuzzing system having a fuzzer.

According to an example embodiment of the present invention, the method comprises: initializing the fuzzing system by setting observations of the fuzzer blank or to one or more initial test cases that are executed on a target program; executing test cases; creating an output report for the test case, wherein the output report includes information about a code coverage of the target program; repeating the execution of the test case in order to determine whether the test case leads to jitter or non-deterministic behavior in the target program; deciding by means of an optimizer based on an estimation, for test cases that generate jitter or nondeterministic behavior, how often the test case should be executed in order to obtain an optimized estimate of the code path distribution; deciding, by means of the optimizer based on an estimate, whether and how test cases are mutated in order to minimize an overall uncertainty and to investigate more areas in the target program; and adding, to a corpus of the test cases, the new test cases that cause a new behavior of the target program.

The target program can, for example, be part of an embedded system. The target program and/or the embedded system can provide an autonomous driving function or another control function for an at least semi-autonomous robot, in particular for an autonomous vehicle. The vehicle can, for example, take the form of a motor vehicle and/or passenger motor vehicle.

The output report can, for example, comprise one or more machine-readable files. The output report is output to the fuzzer and is readable by the fuzzer.

The cause of a new behavior of the target program includes, for example, test cases that cause new behavior, a greater and/or different code coverage and the reaching of a new state.

For example, the optimizer can be set up for the estimation of uncertainties and optimization on the basis of these uncertainties, and can specifically be a Bayesian optimizer.

A second general aspect of the present invention relates to a computer system designed to execute the method according to the first general aspect (or an embodiment thereof).

A third general aspect of the present invention relates to a computer program designed to execute the method according to the first general aspect (or an embodiment thereof).

A fourth general aspect of the present invention relates to a computer-readable medium or signal that stores and/or contains the computer program according to the third general aspect (or an embodiment thereof).

The techniques of the first, second, third and fourth general aspects may in some situations have one or more of the following advantages.

It is made possible to steer a fuzzer to deterministic or even to non-deterministic locations or parts of the code. An efficient fuzzing of jitter-prone fuzz targets can thus be achieved.

In general, a jitter in a system (or during testing of a system) should be prevented. However, it has been found that steering a fuzzer to non-deterministic locations can reveal more and different errors. Code locations that cause a certain randomness in the system, for example as network delay or memory access, may be more prone to undesirable behavior. This undesirable behavior can correspond to randomness, such as an excessive network delay or excessive memory consumption. Now it is possible to steer a fuzzer in the direction of (or away from) these code locations. When a non-deterministic location is reached, a fuzzer can switch its fuzzing mode in order to be able to treat the randomness accordingly.

It is thus possible to deal with jitter or random delays in fuzz targets and to provide feedback-controlled fuzzing for these targets. Feedback-controlled fuzzing is orders of magnitude better and faster than random tests. In addition, the use of state-learning methods is made possible, which renders superfluous the manual specification of a protocol and a labor-intensive implementation. The uncertainty estimates obtained thereby can be used to steer the fuzzing in the direction of the jitter-prone areas of the tested program or to remove it therefrom. Finally, the encryption and discarding of network packets can be taken into account.

The overall effort for fuzzing can be reduced by estimating the uncertainty of jitter-affected parts of the code. On the one hand, normal fuzzing can be carried out as usual by steering the fuzzing away from jitter. On the other hand, the execution can be steered to non-deterministic code parts, which allows them to be better tested and for more information than usual about them to be obtained.

Some terms are used in the present disclosure in the following way.

"Fuzzing" or "fuzz testing" is the automated process of sending randomly generated inputs to a target or target program and observing the reaction of the target.

A "fuzzer" or "fuzzing engine" is a program that automatically generates inputs. It is therefore not necessarily connected to the software to be tested, nor is any instrumentation performed either. However, it has the ability to instrument code, generate test cases, and run programs to be tested. Conventional examples are AFL and libFuzzer.

A "fuzz target" or "target" is a software program or a function that is to be tested by fuzzing. A main feature of a fuzz target should be that it accepts potentially untrustworthy inputs that are generated by the fuzzer during the fuzzing process.

A "fuzz test" is the combined version of a fuzzer and a fuzz target. A fuzz target can then be instrumented with a fuzzer at its inputs. A fuzz test can be executed. The fuzzer can also start, observe and stop a plurality of running fuzz tests (normally hundreds or thousands per second), wherein each test is generated by the fuzzy using a somewhat different input.

A "test case" is a specific input and a specific test run from a fuzz test. In order to ensure reproducibility, runs of interest (finding new code paths or crashes) are saved. In this way, a test case with its corresponding input can also be run on a fuzz target which is not connected to a fuzzer, i.e. in its release version.

"Static instrumentation" is the insertion of instructions into a program in order to obtain feedback about its execution. It is usually realized by the compiler and can, for example, describe the code blocks reached during execution.

"Dynamic instrumentation" is the monitoring of the execution of a program during runtime in order to generate feedback from the execution. It is usually realized by system functionalities of the operating system or by the use of emulators.

"Coverage-guided fuzzing" is the use of code coverage information as feedback during fuzzing in order to detect whether an input causes the execution of new code paths or code blocks.

"Mutation-based fuzzing" generates new inputs by using a set of known inputs (from a corpus) and randomly applying mutations to them.

"Generation-based fuzzing" generates new inputs from scratch, for example by using input models or input grammars.

"Total uncertainty" or "uncertainty" is used in this context to describe an uncertainty of the program behavior of the target program.

"Shared memory area" is a memory area that is shared by a plurality of processes and is usually managed by the operating system.

DETAILED DESCRIPTION OF EXAMPLE EMBODIMENTS

Figure 1:
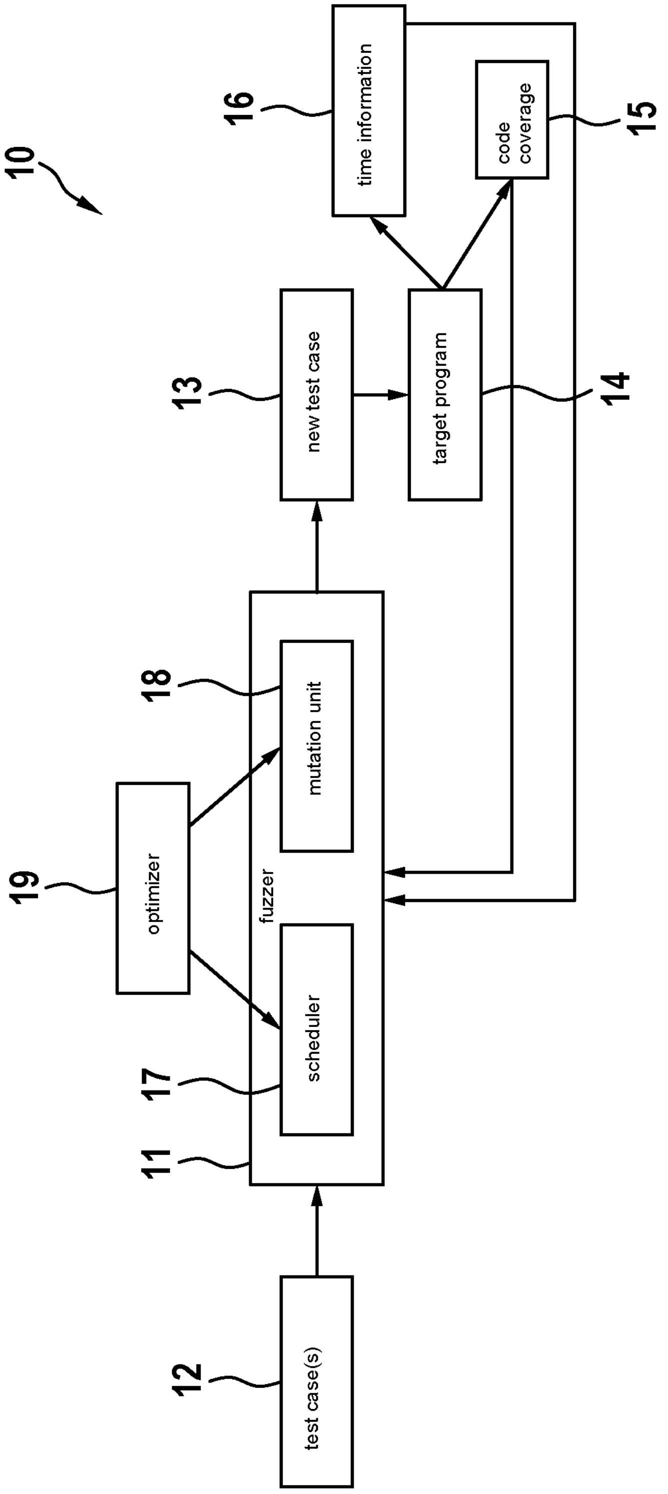
FIG. 1 schematically shows an example system in which the techniques of the present invention can be used for treating uncertainty estimates for non-deterministic fuzz executions.

FIG. 1 shows a fuzzing system 10 having a fuzzer 11. The fuzzing system 10 can be, for example, a computer system or a component thereof.

One or more test cases 12 are fed to the fuzzer 11. The test cases 12 can also be referred to as initial test cases, for example when the fuzzing system 10 is initialized. The test cases 12 can be contained in an input corpus or test case corpus.

The fuzzer 11 can select already existing fuzzing input data (for example, referred to as seed) from a corpus, which may or may not be part of the fuzzer 11. The corpus can, for example, be a database and/or be stored in a specific memory structure. Selected fuzzing input data can be mutated by the fuzzer 11 and tested in a fuzzing iteration of the software on a hardware target. According to a predetermined criterion, the fuzzing input data can be stored in the corpus, for example when, during the execution of the fuzzing iteration, the software found an unexpected behavior (for example, a not yet known path and/or a not yet known memory access). In addition, metadata which, for example, result from the feedback of the (hardware) target can be stored in the corpus. Feedback can be obtained, for example, by static/dynamic instrumentation or by emulation.

A new test case 13 arises by the test case 12 being processed by the fuzzer 11. The processing by the fuzzer 11 will be explained in detail later. The new test case 13 is executed by being input into the target program 14. The target program 14 can be a component of the fuzzing system 10 in order thus to form a control loop. It is also possible that the target program 14 is not a component of the fuzzing system 10, which can to a certain extent correspond to an offline mode.

The target program 14 or fuzzing target can be software (for example a program) and/or a part thereof (for example a function) which is to be tested by fuzzing. The fuzzing target can be such that it accepts potentially untrustworthy input data that can, during fuzzing, be generated by a fuzzer for a plurality of fuzzing iterations. In this context, fuzzing can be seen as the automated process of sending arbitrary and in particular invalid, unexpected and/or random input data to the fuzzing target and then observing its reaction during the execution of this fuzzing iteration. The fuzzer or the fuzzing machine is a computer program that is designed to automatically generate input data for each fuzzing iteration for the fuzzing target.

During and/or after the execution of the new test case 13 by the target program 14, this is observed and an output report is created. This output report contains information about a code coverage 15 of the target program 14. This code coverage 15 is used as feedback during fuzzing in order to detect whether an input has caused the execution of new code paths and/or of new blocks of the code. This code coverage 15 can accordingly indicate which parts and/or how much of the code of the target program 14 is executed or covered by the input of the new test case 13.

The output report can further include information about line coverage, branch coverage, functional coverage, and/or edge coverage. The line coverage and branch coverage indicate which areas or locations of the code, i.e. lines and branches, are covered. The functional coverage indicates which functions of the target program 14 were executed. The edge coverage indicates which branches or code decision points were executed in order to complete the test.

The output report can additionally include time information 16 when testing target programs that have state information. In this way, states of the target program 14 can be captured on a time basis and sorted.

The code coverage 15 and the time information 16 are returned as feedback to the fuzzer 11. In the fuzzer 11, this feedback information is applied to the test cases 12 in order to generate new test cases 13. New test cases 13 can be added to the corpus of test cases if they increase the code coverage.

The fuzzer 11 can be based on a standard greybox fuzzer and contains a scheduler 17 and a mutation unit 18. The scheduler 17 coordinates the execution of the test cases 12, in particular how often a specific test case 12 is to be executed. The mutation unit 18 mutates test cases 12 in order to be able to examine more areas in the code of the target program 14. Areas or parts in the target program 14 can include, for example, lines, branches, functions, routines, nodes of the target program 14.

The proposed fuzzer 11 learns non-deterministic behavior by distributing delays and jitter with the aid of the observation of the coverage and of the timing feedback. For this purpose, the fuzzer 11 is expanded with an optimizer 19, such as a Bayesian optimizer, for example. The optimizer 19 allows an approach for estimating uncertainties and optimizing on the basis of these uncertainties or, in the case of a Bayesian optimizer, a Bayesian optimization and estimation approach. This addition makes it possible for the fuzzer 11 not only to deal with uncertainties and non-deterministic outputs, but also to investigate the space of test cases in a manner that allows program uncertainties to be discovered and modeled. This structure can be used for general software, but also for the state-dependent case in which, depending on the internal state, a program only accepts certain inputs at a certain time.

Specifically, the optimizer 19, for test cases generating jitter or non-deterministic behavior, can decide how often the test case should be executed in order to obtain an optimized estimate of the code path distribution. This decision is output to the scheduler 17. Furthermore, the optimizer 19 can decide whether and how test cases are mutated in order to minimize an overall uncertainty and to investigate more areas in the target program 14. This decision is output to the mutation unit 18.

For example, in a first fuzzing mode, the fuzzer 11 can be steered in a targeted manner to deterministic locations in the target program 14 in order to thus obtain statements or information about the behavior or areas of the target program 14 which cannot otherwise be obtained. Furthermore, in a second fuzzing mode, the fuzzer 11 can be steered in a conventional manner to non-deterministic locations in the target program 14.

The control of the fuzzer 11 or of the fuzzing system 10 can furthermore comprise the fuzzer 11 being switched into another fuzzing mode at a detected deterministic location in the target program 14. For example, the fuzzer 11 can then be put into the above-described first mode.

Figure 2:
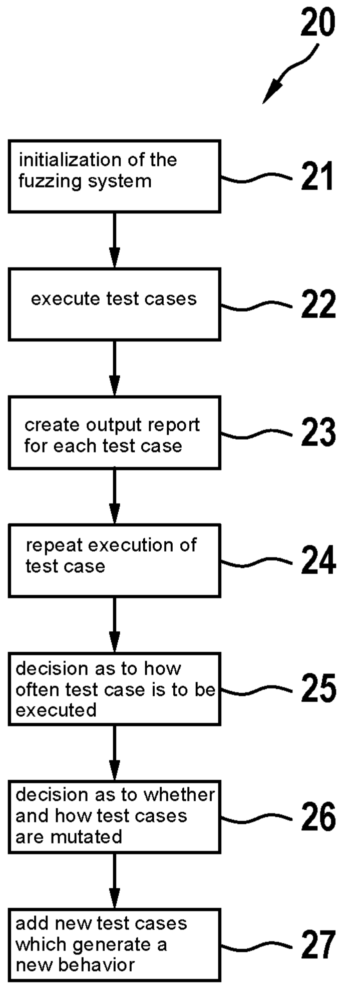
FIG. 2 shows an example flowchart illustrating the techniques of the present disclosure for treating uncertainty estimates for non-deterministic fuzz executions.

FIG. 2 is a flowchart of a method 20 for treating uncertainty estimates for non-deterministic fuzz executions.

First, an initialization 21 of the fuzzing system 10 takes place by setting observations of the fuzzer 11 blank or to one or more initial test cases which are executed on the target program 14.

After the execution 22 of test cases 12, the creation 23 of an output report for each test case takes place, wherein the output report includes information about a code coverage 15 of the target program 14. Optionally, the output report can additionally include time information 16 when testing target programs that have state information.

A repetition 24 of the execution of the test case is carried out in order to determine whether the test case leads to jitter or non-deterministic behavior in the target program 14.

This is followed by a decision 25 by means of the optimizer 19, for test cases generating jitter or non-deterministic behavior, as to how often the test case is to be executed in order to obtain an optimized estimate of the code path distribution.

A decision 26 is then made by means of the optimizer 19 as to whether and how test cases are mutated in order to minimize an overall uncertainty and to investigate more areas in the target program 14.

Finally, an addition 27 of new test cases 13 which generate a new behavior of the target program 14 is made to a corpus of the test cases 12. The cause of a new behavior of the target program includes, for example, test cases that cause new behavior, a greater and/or different code coverage and the reaching of a new state.

The method 20 can optionally further comprise: steering the fuzzer 11 in a first fuzzing mode to deterministic locations in the target program 14 and/or steering the fuzzer 11 in a second fuzzing mode to non-deterministic locations in the target program 14.

The method 20 can optionally further include switching the fuzzer 11 into a different fuzzing mode when a non-deterministic location is reached in the target program 14.

The method 20 can optionally further comprise the output report including information about a line coverage, branch coverage, functional coverage, and/or edge coverage.

The method 20 can optionally further comprise the output report including time information 16 when testing target programs that have state information.

The method 20 can optionally further comprise the new test cases 13 being selectable for further mutations.

The method 20 can optionally further comprise the fuzzing system 10 including encryption and/or discarding of network packets.

Furthermore, a computer system 10 is disclosed, at least partially shown in FIG. 1, which is designed to execute the (computer-implemented) fuzzing method 20. The computer system 10 can be, for example, a server in a network (for example, Internet, intranet, . . . ). The computer system 10 can comprise at least one basic software adapter BSWA. The computer system 10 can comprise a plurality of basic software adapters BSWA, from which, for example, a basic software adapter BSWA suitable for a selected application software ASW can be selected. The computer system 10 can comprise a processor and/or a working memory. The computer system 10 can comprise a (non-volatile) memory in which, for example, an input database is stored.

Furthermore, a computer program is disclosed which is designed to execute the (computer-implemented) fuzzing method 20. The computer program can be present, for example, in interpretable or in compiled form. For execution, it can (even in parts) be loaded into the RAM of a computer, for example as a bit or byte sequence.

Also disclosed is a computer-readable medium or signal that stores and/or contains the computer program. The medium can comprise, for example, any one of RAM, ROM, EPROM, HDD, SDD, on/in which the signal is stored.

What is claimed is:

1. A method for treating uncertainty estimates for non-deterministic fuzz executions in a fuzzing system having a fuzzer, comprising the following steps:
- initializing the fuzzing system by setting observations of the fuzzer to a blank state [blank] or to one or more initial test cases that are executed on a target program;
- executing test cases;
- for each of the executed test cases:
  - creating an output report that includes information about a code coverage of the target program;
  - repeating the execution of the respective test case a plurality of times to determine variability in execution behavior of the target program and to thereby determine whether the test case leads to jitter or non-deterministic behavior in the target program; and
  - determining, based on the variability in execution behavior across the plurality of executions, an uncertainty estimate associated with the execution behavior of the respective test case;
- for each of those of the test cases determined to generate jitter or non-deterministic behavior, deciding, using an optimizer configured to process the uncertainty estimate determined for the respective test case, how often the respective test case is to be executed based on the uncertainty estimate in order to obtain an optimized estimate of a code path distribution of the target program;
- deciding, using the optimizer and based on the uncertainty estimate, whether and how the test cases are mutated to obtain new cases in order to reduce the uncertainty estimate, minimize overall uncertainty, and investigate more areas in the target program; and
- adding, to a corpus of the test cases, the new test cases which cause a new behavior of the target program.

2. The method according to claim 1, comprising the following steps:
- steering the fuzzer in a first fuzzing mode to deterministic locations in the target program and/or steering the fuzzer in a second fuzzing mode to non-deterministic locations in the target program.

3. The method according to claim 1, wherein, upon reaching a non-deterministic location in the target program, the fuzzer is switched into another fuzzing mode.

4. The method according to claim 1, wherein the output report includes information about a line coverage, and/or a branch coverage, and/or a functional coverage, and/or an edge coverage.

5. The method according to claim 1, wherein the output report includes time information when testing target programs that have state information.

6. The method according to claim 1, wherein the new test cases can be selected for further mutations.

7. The method according to claim 1, wherein the fuzzing system includes encrypting and/or discarding network packets.

8. The method according to claim 1, wherein the optimizer includes a Bayesian optimizer.

9. A computer system configured to treat uncertainty estimates for non-deterministic fuzz executions in a fuzzing system having a fuzzer, the computer system configured to:
- initialize the fuzzing system by setting observations of the fuzzer to a blank state or to one or more initial test cases that are executed on a target program;
- execute test cases;
- for each of the executed test cases:
  - create an output report that includes information about a code coverage of the target program;
  - repeat the execution of the respective test case a plurality of times to determine variability in execution behavior of the target program and to thereby determine whether the test case leads to jitter or non-deterministic behavior in the target program; and
  - determine, based on the variability in execution behavior across the plurality of executions, an uncertainty estimate associated with the execution behavior of the respective test case;
- for each of those of the test cases determined to generate jitter or non-deterministic behavior, decide, using an optimizer configured to process the uncertainty estimate determined for the respective test case, how often the respective test case is to be executed based on the uncertainty estimate in order to obtain an optimized estimate of a code path distribution of the target program;
- decide, using the optimizer and based on the uncertainty estimate, whether and how the test cases are mutated to obtain new cases in order to reduce the uncertainty estimate, minimize overall uncertainty, and investigate more areas in the target program; and add, to a corpus of the test cases, the new test cases which cause a new behavior of the target program.

10. A non-transitory computer-readable medium on which is stored a computer program for treating uncertainty estimates for non-deterministic fuzz executions in a fuzzing system having a fuzzer, the computer program, when executed by a computer, causing the computer to perform the following steps:

initialize the fuzzing system by setting observations of the fuzzer to a blank state [blank] or to one or more initial test cases that are executed on a target program;

execute test cases;

for each of the executed test cases:

create an output report that includes information about a code coverage of the target program;

repeat the execution of the respective test case a plurality of times to determine variability in execution behavior of the target program and to thereby determine whether the test case leads to jitter or non-deterministic behavior in the target program; and determine, based on the variability in execution behavior across the plurality of executions, an uncertainty estimate associated with the execution behavior of the respective test case;

for each of those of the test cases determined to generate jitter or non-deterministic behavior, decide, using an optimizer configured to process the uncertainty estimate determined for the respective test case, how often the respective test case is to be executed based on the uncertainty estimate in order to obtain an optimized estimate of a code path distribution of the target program;

decide, using the optimizer and based on the uncertainty estimate, whether and how the test cases are mutated to obtain new cases in order to reduce the uncertainty estimate, minimize overall uncertainty, and investigate more areas in the target program; and add, to a corpus of the test cases, the new test cases which cause a new behavior of the target program.

* * * * *